Feb. 21, 1956
C. M. ESTES
2,735,350
SEED COVERING DRAG CONTROL FOR ROW CROP PLANTERS
Filed Oct. 26, 1953
2 Sheets-Sheet 2
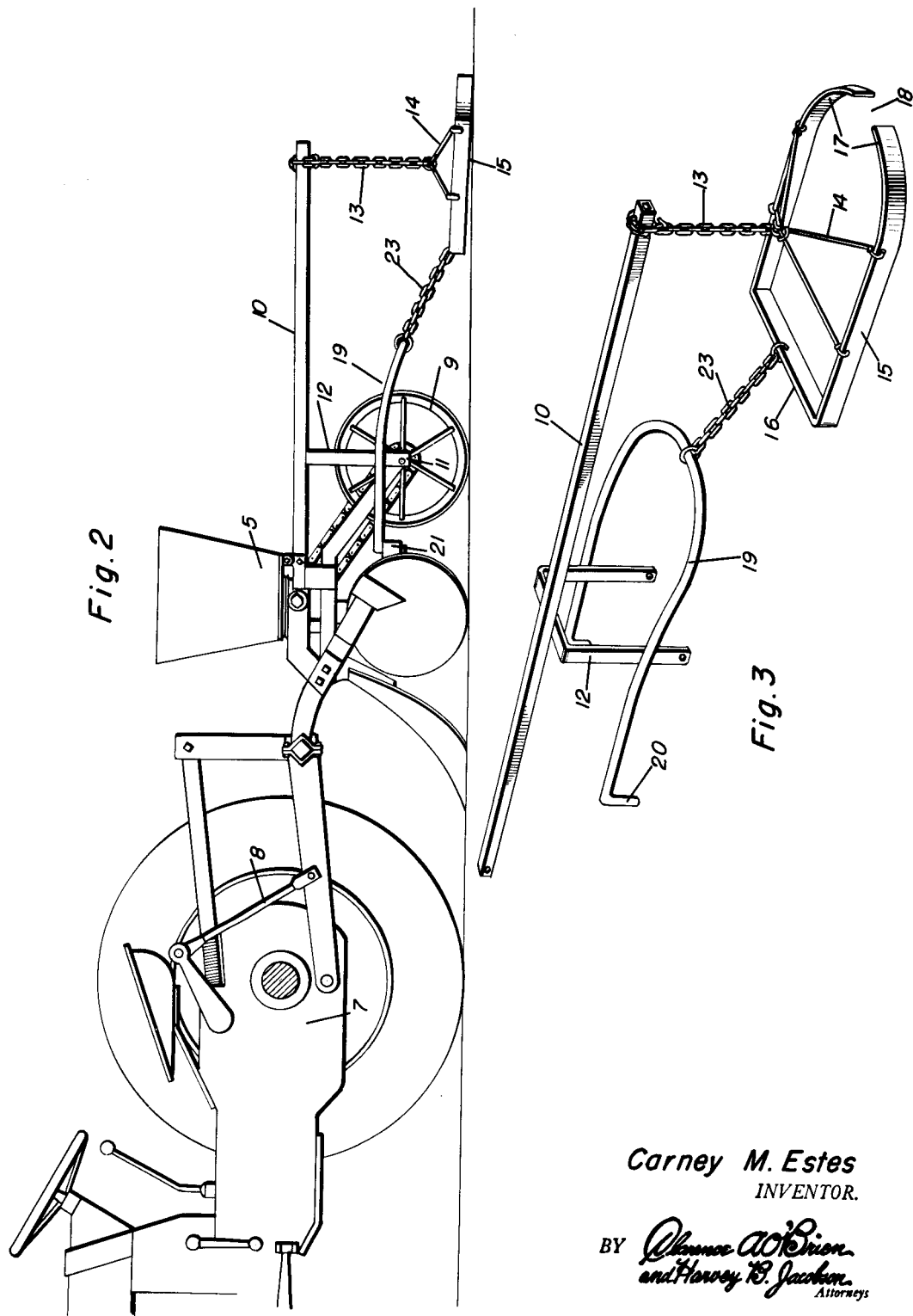
Carney M. Estes
INVENTOR.

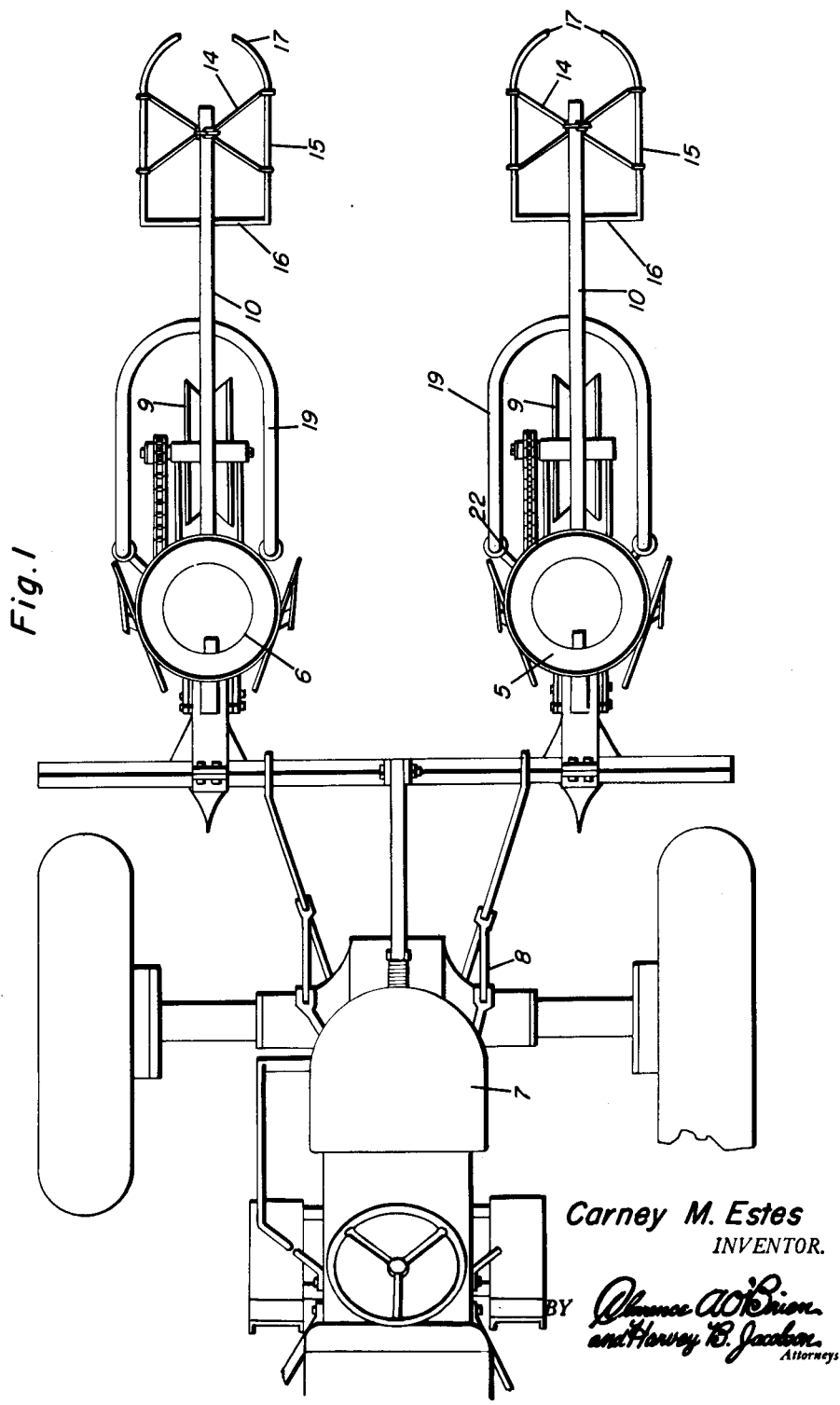

United States Patent Office 2,735,350
Patented Feb. 21, 1956

2,735,350

SEED COVERING DRAG CONTROL FOR ROW CROP PLANTERS

Carney M. Estes, White Deer, Tex.

Application October 26, 1953, Serial No. 388,202

1 Claim. (Cl. 97—56)

The present invention relates to new and useful improvements in drags for row crop planters to cover a furrow into which seed has been dropped.

An important object of the invention is to provide a seed covering drag which may be easily and quickly attached to and supported on a tractor drawn planter for lifting therewith when the tractor is turned at the end of a field.

Another object is to provide a beam adapted for mounting on the planter in a rearwardly extended position and at the rear end of which the drag is supported lightly on the surface of the ground and relieved of its weight to regulate the depth at which the drag works.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view;

Figure 2 is a side elevational view; and

Figure 3 is a perspective view of one of the drag units detached from the planter.

Referring now to the drawings in detail, wherein for the purpose of illustration I have disclosed a preferred embodiment of my invention, the numerals 5 and 6 designate a pair of conventional type of planters drawn behind a tractor 7 and equipped with the usual lift mechanism 8 to raise the planters when desired, as when turning the tractor at the end of a field. The planters include ground wheels 9 which drive the seed feeding mechanism (not shown) of the respective planters.

A beam 10 is attached at its front end to a part of the planter structure and extends rearwardly therefrom and the beam is supported on the axle 11 of wheel 9 by an inverted U-shaped member 12. A chain or other flexible member 13 is attached to the rear end of the beam and an X type cable hanger 14 is attached at its center to the lower end of chain 13 and with the ends of the hanger attached to the sides of a substantially U-shaped drag 15. The front of the drag is closed by a cross-bar 16 and the rear ends of the sides of the drag are curved inwardly toward and spaced from each other, as shown at 17, to provide an opening 18 to build an earth ridge over a furrow behind the planter.

The cross-bar 16 at the front end of the drag is attached to the planter by means of a U-shaped horizontal connector 19 having downwardly projecting front ends 20 inserted in sleeves 21 rigidly attached to a part of the planter structure by arms 22 and a chain 23 connects the rear portion of connector 19 to the cross-bar 16 of the drag. The chain 23 extends forwardly from the drag in an upwardly inclined position to prevent the front end of the drag from digging into the soil as the drag is pulled forwardly by the chain 23 and connector 19.

The beam 10 are being rigidly supported on the planter will in turn support the drag 15 in a fixed position relative to the surface of the ground so that the drag will lightly move over the ground without scraping too deeply into the surface as the soil is scraped over the furrow to cover the seed deposited therein.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim:

What is claimed as new is as follows:

A drag attachment for tractor drawn planters comprising a beam attached at one end to the planter and extending rearwardly therefrom, a flexible hanger at the rear end of the beam, a substantially U-shaped drag attached at its side portions in a substantially horizontal position to the lower end of the hanger member, a substantially U-shaped conector having downwardly projecting pins at its end portions, sleeves on the planter in which the pins are inserted to support the connector in a horizontal position, and flexible means connecting the drag to the connector to pull the drag behind the planter.

References Cited in the file of this patent

UNITED STATES PATENTS

| | | |
|---|---|---|
| 574,554 | Mannewitz | Jan. 5, 1897 |
| 1,226,637 | Bunker | May 22, 1917 |
| 1,303,222 | Stevens et al. | May 6, 1919 |
| 1,345,532 | Cass | July 6, 1920 |
| 1,618,958 | Kassebeer | Feb. 22, 1927 |
| 2,641,210 | Brock | June 9, 1953 |